Sheet 1 - 4 Sheets.

B. Arnold.

Netting Mach.

No. 2,622

Reissued May 28, 1867.

Witnesses.
Wm. D. Arnold
Horace N. Foster

Inventor.
Benjamin Arnold

N. PETERS, PHOTO-LITHOGRAPHER, WASHINGTON, D. C.

Sheet 2-4 Sheets.
B. Arnold.
Netting Mach.
No. 2,622 Reissued May 28, 1867.
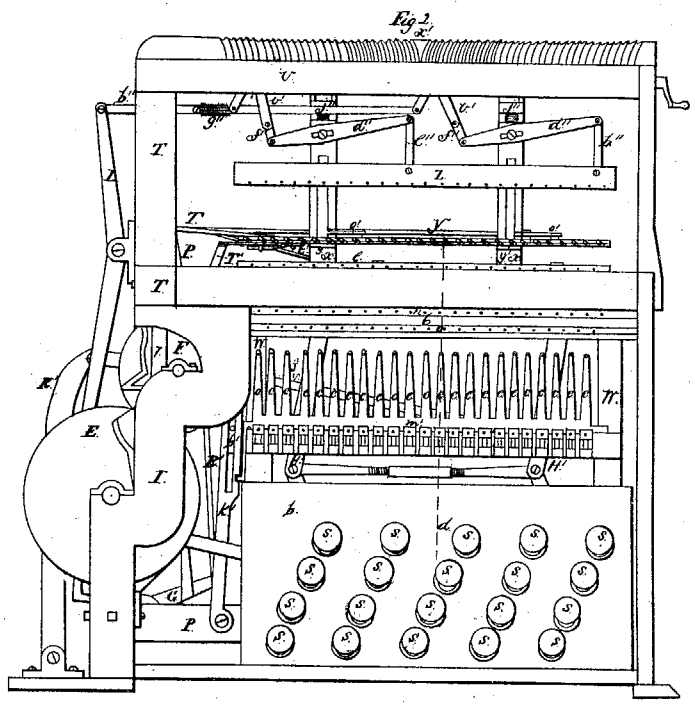
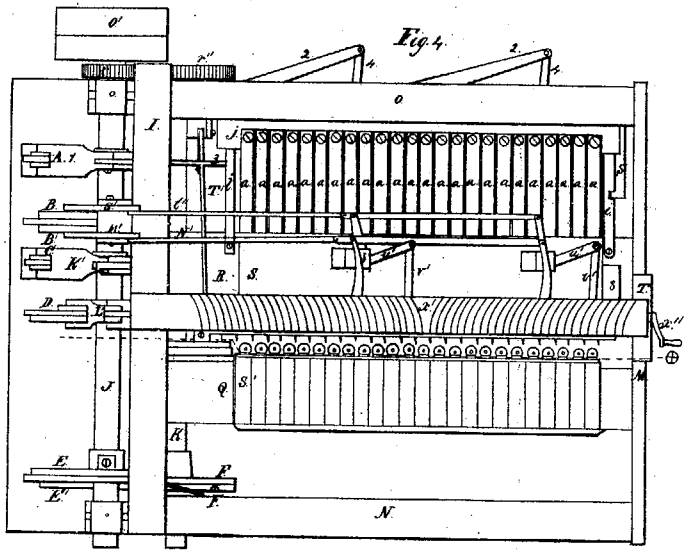
Witnesses.
Wm. D. Arnold
Horace A. Porter
Inventor.
Benjamin Arnold
N. PETERS, PHOTO-LITHOGRAPHER, WASHINGTON, D. C.

Sheet 3-4 Sheets.

B. Arnold.

Netting Mach.

Reissued May 28, 1867.

No. 2,622.

Witnesses.
Wm D Arnold
Horace N Foster

Inventor.
Benjamin Arnold

N. PETERS, PHOTO-LITHOGRAPHER, WASHINGTON, D. C.

B. Arnold.
Netting Mach.
No. 2,622. Reissued May 28, 1867.
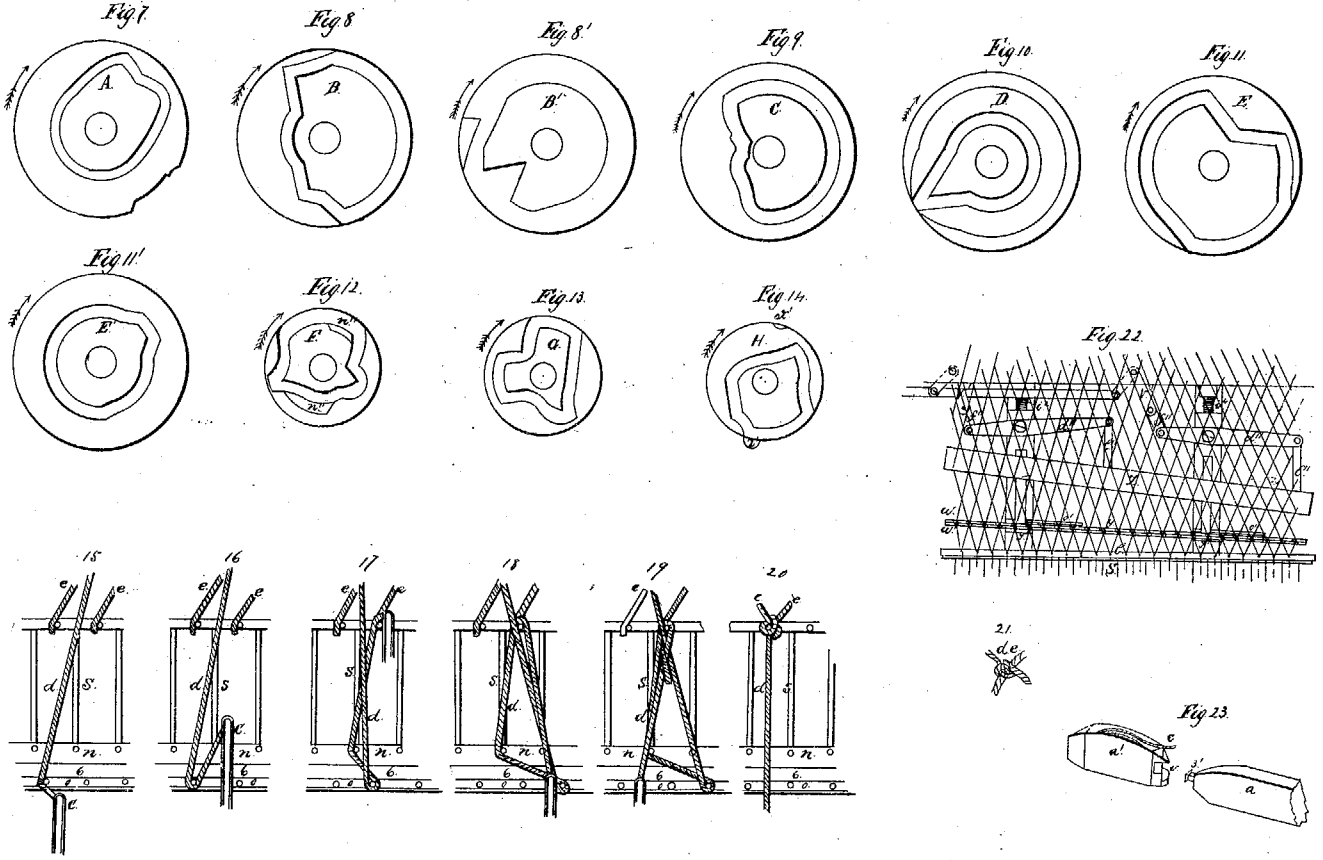
Witnesses:
Wm. D. Arnold
Horace N. Foster
Inventor
Benjamin Arnold
N. PETERS, PHOTO-LITHOGRAPHER, WASHINGTON, D. C.

United States Patent Office.

WILLIAM E. HOOPER & SONS, OF BALTIMORE, MARYLAND, ASSIGNEES OF BENJAMIN ARNOLD.

*Letters Patent No.* 36,499, *dated September* 23, 1862; *antedated August* 3, 1860; *reissue No.* 2,622, *dated May* 28, 1867.

IMPROVEMENT IN MACHINE FOR MAKING SEINE-NETS.

The Schedule referred to in these Letters Patent and making part of the same.

TO ALL WHOM IT MAY CONCERN:

Be it known that I, BENJAMIN ARNOLD, of East Greenwich, in the county of Kent, and State of Rhode Island, have invented a new and useful Machine for Making Nets and Netting; and I do hereby declare that the following is a full and correct description thereof, reference being had to the accompanying drawings, and to the letters of reference marked thereon.

The same letters refer to similar parts in all the figures.

Figure 2 is a front elevation.

Figure 4 is a top view.

Figure 7 is a cam, A, that moves the twine-carriers in the race-ways S S′, and also, by a recess, *k*, in its edge, closes the holding-pins W upon the row of knots last tied.

Figure 8 is both sides of the cam B, one side of which, B, moves the pin-bar *l*, and the other side, B′, moves the pin-bar Y forward and back.

Figure 9 is cam C, that moves the carriage F′ up and down.

Figure 10 is cam D, that moves the pin-bar Z up and down.

Figure 5:
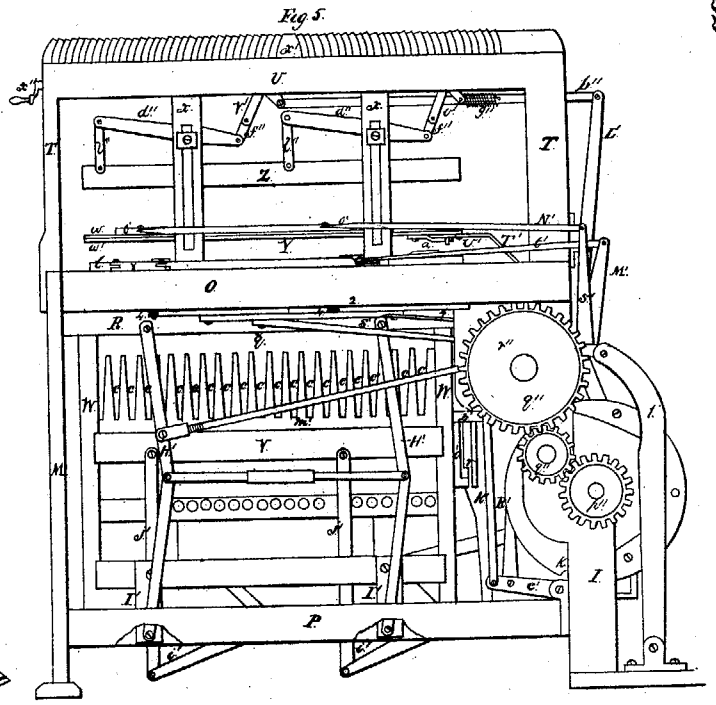
Figure 5 is a back elevation.
Figure 1:
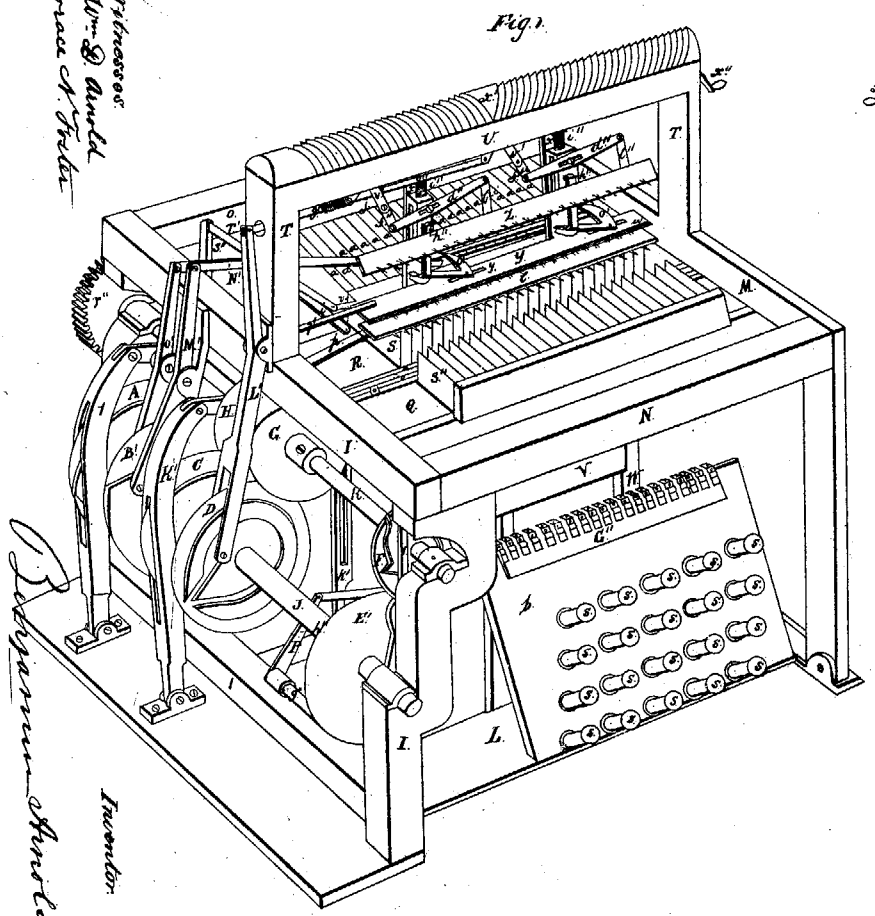
Figure 1 is a perspective view of the machine.

Figures 11 and 11′ are both sides of cam E, one side of which, E, moves the carriage V up and down, and the other side, E′, moves the bar 6.

Figure 12 is cam F, that moves the bar *o* endways.

Figure 13 is cam G, that moves the bar *m′* endways.

Figure 14 is cam H, that moves the bar Y endways. A recess in *x′* and a projection, *z′*, upon the edge of this cam, give motion endways to the pin-bar *l*. The point marked ‡‡ at the top of each cam indicates that part of the cam that must be brought exactly over the centre of the shaft in all of them at the same time to obtain their correct chronological order.

Figures 15 to 20 show the different positions of the twines in making the knot. These figures are enlarged.

Figure 21 represents the knot.

Figure 22 shows the arrangement of the holding and feeding parts while tying a row of meshes larger at one end of the machine than at the other.

Figure 23 represents a twine-carrier, *a′*, and the bar *a* that moves it.

Figure 3:
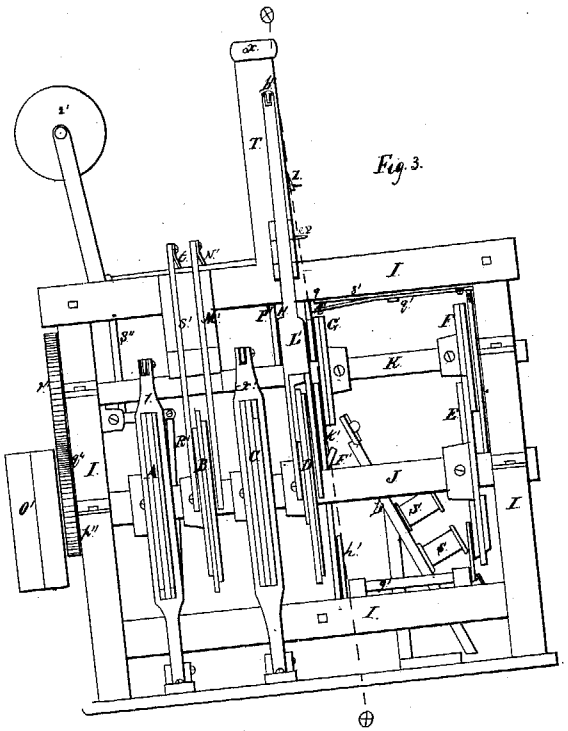
Figure 3 is an end elevation.
Figure 6:
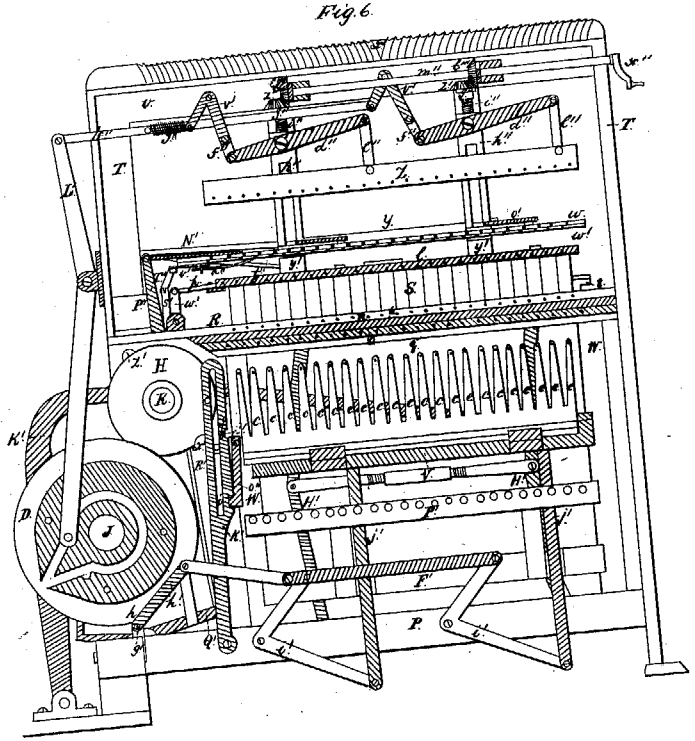
Figure 6 is a vertical section of the machine taken through in the direction of the lines ⊕, (see figs. 3 and 4.)

The framework of the machine is composed of a head or end frame, I, which contains the rotating parts, and which consists of two uprights having suitable bearings for the shafts J K, and beams connecting the uprights; also of a platform upon which the uprights stand, and which serves to hold some of the levers. This head frame is connected to another end frame by beams, viz, a front beam, N, a back beam, O, and a lower beam, P, also by the bed-plates R Q. On the top, and near the middle of each end frame, are placed short uprights T T, which are connected together at the top of the beam U. Two or more guide-rails W W are placed between the bed-plate R and the lower beam P, upon which the guide-carriage V and carriage F′ slide up and down. From the upper beam U are two or more guide-bars X X extending down to the top of the race-ways S, upon which the carriages *h″ h″*, that hold the two pin-bars Z Y, slide. Two or more guide-rods *i i* are placed between the back beam O and the bed-plate R to support the carriage *j*. A frame or board, *b*, is placed in front of the beam P on a support, L, extending from one end frame to the other to hold spools of twine *s s s*. The knots are made by forming loops of the twine from the spools *s s*, and passing through these loops carriers *a′*, containing twine, as will be hereafter described. The loops are formed from the spool-twines alternately to the right and left, and a carrier to the right of a spool-twine, passing through, a knot is tied with that carrier-twine. The next time the carrier to the left of the same spool-twine passes through a new loop made from the same spool-twine, and a knot is tied with that carrier-twine. In this alternate right and left tying of the knots certain motions required are the same for each row of knots, while certain other motions are the reverse in tying one row to what they are in tying the other row. The first-named set of these motions is produced by the cams upon the shaft J, which makes a complete revolution while the machine is tying each row. The second set of motions is made by the cams upon the shaft K, which make but one half a revolution while the machine is tying one row. The other half of each cam is constructed so as to produce reverse motions while tying the next. The parts and motions of the machine may be classified, to be more readily understood, as follows:

Class first comprises those parts and their motions that are used in forming the loops of the spool-twines. The figs. 15, 16, 17, 18, 19, 20, indicate the manner in which the loop is formed. The spool-twine *d*, before the first movement, lies in a straight line from the guide *c* to the bar *y*, (not shown in these figures,) where it joins line *e* by the last knot tied. Fig. 15 is the first position. The pin-bar *o* has passed to the left, relatively to carriage V, which carries the guide *c*, and has carried the spool-twine *d* with it. Fig. 16, the second position. The guide *c* has moved upwards and to the right, and pin-bar *o* has begun its reverse motion to the right; the twine between it and the end of the guide *c* is being caught upon the stationary pin *n*, the ends of the guides being pressed towards the race-ways S (in which the carriers are placed) at this time for this purpose, as the stationary pins do not project out so far as the pins in bar *o*. Fig. 17 is the third position. The guide *c* has reached the extreme point of its upward motion, and, by moving still further to the right, has carried the twine around the pin in bar *l*, which has moved forward to catch the twine well on to the pin; at the same time the pin-bar *o* has continued its motion to the right, and has carried the twine between it and the last knot, over and free from the top of the stationary pin *n*. Fig. 18 is the fourth position. The guide *c* has moved down and has finished its motion to the right; the pin-bar *o* has also completed its motion in the same direction, and the loop is ready for the first passage of the carrier *a'*, of which the ends are made tapering to go through the loops easily. Fig. 19 is the fifth position. The carrier has come forward, carrying its twine through the loop of spool-twine *d*, the guide *c* has moved over to the left side, and the carrier has passed back to place through the loop last mentioned, and, in so doing, has crossed its twine *e* over the twine *d*, reaching from the guide *c* to the pin in the bar *l*. The loop is now ready to be cast off of the pins in bars *o* and *n* and drawn up. Fig. 20 is the sixth position. The loop has been cast off, as above stated, and drawn up around the pin in bar *l*; and, when drawn up to the proper degree of tightness, bar *l* moves back, and, drawing the pin out of the loop or knot, leaves it to be made tight. The parts and motions used in making the loops are as follows: the cam E raises and lowers the carriage V with the guides *c c* by the lever *f'*, which moves the rocker-shaft *g'* and lever *h'* upon its other end, which is connected to the two knee-levers *i' i'*, which move the carriage by the bars *j' j'*. The cam G produces the motion endways of the bar *m'* and guides *c c c* by means of the lever *k'*, which is pivoted to the lower beam P, and has a slot in its upper part for the end of connecting-rod *l'* to move in. This slot is to allow the carriage V to move up and down at the same time the bar *m'* is moved endways. The guides *c c* are attached to the bar *m'*, which slides endways in the clasps *n'*, on carriage V, and are tipped to and from the pins in making the loops by means of the bar *o''*, which is attached to one end of it, (see fig. 6,) and whose lower end rests upon the lever *k'*, and is moved at the proper places in its ascent and descent by the notches *r r* in that lever through which its end passes from one side to the other. The pin-bar *o*, which is held in a recess in the bed-plate R by a screw, *q*, fitting into a slot in its under side, is moved by the cam F through the lever *p'*, fig. 4, which is connected to the lever *q'* under the top girt of frame, (see fig. 3.) This lever is connected to bar by rod *r'*. The pin-bar *l* is moved forward by cam B and lever *j*, which is connected by rod *t'* to the knee-levers *u' u'* pivoted to the top of the race-ways S, and which are connected to the bar *l* by the rods *v' v'*. This bar is also moved a little endways by the lever W' which rests upon the edge of cam H, in which there is a recess, *x*, on one side, and a projection, *z*, upon the other, the lever W' being held against the cam by spring *t*, (see fig. 5.) The above-described motions for forming the loop are those used when making the knot commonly called "seine knot" or fisherman's knot, but when the knot known as the "square knot" is preferred it is simply requisite to detach the pieces *n'' n''* on cam F, (fig. 12.) The effect of this is to delay the opening of the loop, which would otherwise take place across the aperture of the race-ways S, until after the first passage of the carriers, by retarding the motion of the pin-bar *o*.

Class second, parts and motions employed in passing and returning the carriers of twine *a'* through the loops of spool-twine, and for casting off the loops from the pins when they are ready to be drawn up. The cams move their levers (except levers W' Q') by means of friction-rolls mounted on studs, which project from the sides of the levers into the grooves in the sides of the cams. The sides of these grooves, being properly shaped, push the levers back and forth as the cams turn. Cam A gives motion to the carriage *j* by means of lever 1, which is connected to the two knee-levers 2 2 (see fig. 5) by the bar 3, the levers 2 2 being connected to the carriage by the rods 4 4. From the carriage *j* projects a row of bars, *a a*, one for each division of the race-ways S, in which they slide. These race-ways S S' are represented as being made rectangular, but they may be made of other shape, as oval, or round, in which latter shape I made them at first, and their position is also shown as being horizontal, but I first used them in a vertical position and brought the finished netting out over the front beam; but finding that the weight of the carriers filled with twine, which had to be raised and lowered for every row of knots tied, retarded the operation of the machine, I changed them to the horizontal position, as shown. So, in this particular, I would not be understood as confining myself either to the shape or position of the race-ways or carriers. The bars *a a* are long enough to reach to the front series of race-ways S when the carriage *j* is clear forward; and each bar has upon its end a prong or hooks 3', (see fig. 23,) which catches into a recess in the end of the carriers *a'* for the purpose of drawing them back after being pushed through the loops. When the ends of the bars *a a* are raised the hooks are released from the carriers and slide back without them. This raising of the bars is done by means of the bar 5 (see fig. 4) fastened to the carriage $j$, and the end of which is lifted by the projection 8 on bed-plate R. The loops are cast off of the pins on which they are made by means of bar 6, which is placed in the recess in the bed-plate R with pin-bar $o$, and moves on pins in the side of that bar. The slots in bar 6, in which these pins play, being made diagonal to the edge of the bar, cause it to come out of the recess when pulled endways and return back into it when pushed in an opposite direction. These motions are given to the bar by cam E′ through lever 7, which is connected to lever 8′ on the under side of the top girt of frame I, (see fig. 3.) The other end of lever 8′, being connected to the bar 6 by rod 9 and the pins in bar $l$, are cleared of the knots by the bar moving back by a contrary movement of the parts that moved it forward, (described in class first.)

Class 3 the parts and motions used in drawing up the loops into knots, also for taking up the netting after a row of knots has been tied preparatory to tying another row. The drawing up of the loops and knots is done by bar or carriage F′, which slides up and down on guides W W. The nipper-bar G″ may be placed on carriage F′ in place of bar F″, in which case the carriage will require twice as much length of motion up and down as will be necessary if placed as shown. The nippers are made in two parts, hinged together. The upper part being bent at a right angle, or nearly so, has two holes in it, one on each side of the angle, for the twine to pass through. They are fastened to the bar by the lower part, and in such a position as to bring the edge of the bar half-way, or nearly so, between the hole nearest the hinge and the angle, so that the twine that passes from the lower hole to the upper on the under side shall be liable to be pinched against the bar when the top of the nipper is drawn down by the twine in the bar F″, or carriage F′ is moved by the jointed or toggle-levers H′ H′, (see fig. 5,) which are pivoted at their upper ends to bed-plate R, and connected at their lower ends to the carriage by plates I′ I′. These jointed levers are connected by rod J′ to the cam-lever K′, which is moved by cam C. The bar Y, which holds the last row of knots, is made in two parts, $w$ $w'$, one of which slides upon the other. Each one of these parts has a row of pins in its edge corresponding in number and distance apart with the race-ways S. The pins in the upper part of the bar are bent down slightly over the lower part, and those in the lower part are bent up a little, so that when the upper part is slid endways upon the other the pins in it will come in contact with those in the other part. Between these two rows of pins the twine of the last mesh is held, close to the last row of knots, which are drawn up snug to the front of the pins by bar Z at the upper end of the mesh. This bar Y has a motion backwards and forwards, and also endways. The first is given by cam B′ and lever M′, which connects by rod N′ to the knee-levers $o'$ $o'$, pivoted to the lower ends of the carriages $h''$ $h''$, and which move the bar by means of the pins $z$ $z$ in their angles working in the slots $y$ $y$ in the bar. These slots are made to allow the bar Y to slide endways by motion given to it by cam H acting upon lever P′, which is connected to the bar Y by rod 7′. The motion of the upper part $w$ of the bar upon the lower is caused by recess $k$ in the edge of cam A, which receives the end of the lever Q′, which is connected by rod R′ to the knee-lever S″, the upper end of which is connected by the bar T′ to knee-lever U′, which is pivoted to the upper part of bar Y, and has one end connected to the lower part of $w'$ by a rod, $a''$, which has a screw-thread upon it, and a nut fitted to it, so that it can be adjusted to bring the pins in the two parts nearer together or farther apart as the twine used is fine or coarse. The bar Z, which draws up the finished netting, is moved up and down by the cam D acting upon lever L′, which is connected by the rods $b''$ $c''$ to the knee-levers V′ V′ which are pivoted to the top beam U, (see fig. 6,) and whose lower ends are connected to the levers $d''$ $d''$ by short straps $f''$ $f''$, and the levers $d''$ $d''$ are connected to the bar Z by the rods $l''$ $l''$. The spring $g''$ on the connecting-rod $b''$ is to allow the cam-lever L′ to be moved its usual distance by the cam D, whether the mesh being tied is large or small, for the smaller the mesh the less will be the motion downward of bar Z, but in moving up it always goes so far as to bring the long arms of the knee-levers V′ V′ and straps $f''$ $f''$ nearly in straight lines with each other. By these means the whole strain of holding the netting while the knots are being tightened by bar F″ is taken off of lever L′, and thrown directly upon the beam U.

Class 4 will explain the parts and motions for regulating the size of the meshes. The two bars Y Z, before mentioned, are placed upon the carriages $h''$ $h''$, the bar Z being placed on them near their tops, and the bar Y sliding on standards Y′ Y′ at their lower ends. The carriages $h''$ $h''$ are moved to and from or held at a certain distance from the pin-bar $l$ by the screws $i''$ $i''$ that screw into the upper ends of the carriages, and are held by the standards $j''$ $j''$, which are firmly fastened to slides X X, and have upon their upper ends bevel gear-wheels Z′ Z′ which mesh into the gear-wheels $l'''$ $l'''$, on rod $m''$, which extends out through the frame, and has a crank, $x''$, upon it to turn it. The use of the screws and gear-wheels is to regulate the size of the meshes or lengths of twine between the knots, which may be done by turning the crank without stopping the machine. The distance of the bar Y, which holds the last row of knots, from the pins in bar $l$, around which the next row of knots will be drawn up, governs the length of the sides of the meshes, and by raising or lowering the carriages $h''$ $h''$, by means of the screws $i''$ $i''$, the sides of the meshes are lengthened or shortened. The bar Z requires to be held at about twice the distance from bar Y that bar Y is held from bar $l$, as there is a whole mesh between them, while there is only one half a mesh between bar Y and bar $l$, (see fig. 22, where the netting and twine are shown.) This relative distance between the bars is maintained through all the sizes of mesh without any other adjustment beyond turning the crank $x''$, by pivoting the levers $d''$ $d''$ to the carriages $h''$ $h''$ at about one-third of their length from the end by which they are moved. By this arrangement, when the distance between bar Y and bar $l$ is increased, say one-fourth of an inch, by moving the carriages up that distance the middle pivots of the levers $d''$ $d''$ are also raised up that distance, and as the short ends of the levers are held at a fixed distance from the beam U, the long end will draw up the bar Z a distance in proportion to their lengths, and will thus maintain its proper position relative to the other bars. By loosening one of the standards $j''$ $j''$, and turning one of the screws $i''$ alone its carriage may be set lower than the other, (see fig. 22.) This feature of the machine is very useful in making nets of that class that includes scoop-nets, fyke-nets, nets for boiling vegetables in, nets for protecting fruit on the trees from birds, and those worn on the head by young ladies to confine the hair, with many others that are made in the shape of a bag, or tapering tunnel, as they can be cut off and put together without gores or making waste in cutting up the netting; the two cut edges being brought together and fastened, the small meshes will form the small end of the net. I have avoided mainly the use in my machine of springs or weights for producing the return motions or the return of parts to their places after being moved by the cams, using positive motions produced by the same cams instead, though many of those motions may be given by springs or weights, but with less certainty of operation.

The operation of the machine and sequence of motions are as follows:

The twines (see fig. 2, line *a*,) are threaded from the spools *s s* up through the nippers G′, then through the bar or carriage F′, (if the nippers are not placed on the carriage,) then up through the holes in the upper ends of the guides *c c*, across the interval left between the two series of race-ways S S′ to the bar Y, where it is connected to the twine from the carriers in the race-ways and fastened to the last row of knots; motion being given to the main shaft J by a belt on the pulley *o*′, the gear-wheels *p*″ *q*″ *r*″ communicating motion to the shaft K and its cams. The cam F moves the pin-bar *o* endways, and the pins pass by the ends of the guides *c c*, (see fig. 15,) then the cam E moves the guide-carriage V upwards. As the guides *c c* move upward their upper ends are pressed towards the race-ways S, (when the stationary pins catch the twine,) by the end of the bar *o*″ passing through a notch, *r*, in lever *k*′, and sliding up on the front side of that lever; but, when coming down, the same end passes through the notch *r* at the upper end of the lever and passes down on the back of the lever, which tips the upper end of the guides away from the race-ways and keeps them clear of the loops. As the guides *c* pass up and around the pins in bar *l*, (see fig. 17,) that bar is moved forward to catch the twine on its pins by cam B′. The guides *c c* are moved sideways by cam G at the same time the pin-bar *o* has begun its motion back and has carried that portion of the twine that lies between the pins of that bar and bar Y over and clear of the stationary pins *n*, (see fig. 17,) and that part of the twine between the bar *o* and the ends of the guides *c c* is caught upon the stationary pins *n n*. By a reverse motion of its levers the guide-carriage is moved down until their ends are over bar *o*, at the same time finishing its motion endways so that the guides *c c* (see fig. 18) hold the twines in proper position for the carriers to pass. The bar *o* has also finished its motion endways, opening the loops (when tying the seine knot) for the carriers *a*′ *a*′. The carriage *j* is now moved forward by cam A pushing the carriers in the race-ways S through the loops into the race-ways S′ by means of the bars *a a*. When the bars are most through the loops the end of bar 5, on carriage *j*, rises upon the projection 8 on the bed-plate R, and, tipping the carriage *j*, raises the ends of the bars and releases the hooks from the carriers, allowing the bars to be drawn back without them; and when the bars are far enough back to admit of the twines in guides *c* passing the opening in the race-ways the guides are moved over to the other side of the loops, (see fig. 19,) when carriage *j* again brings forward the bars *a a*, the ends of which are raised, as before, by bar 5 and projection 8; but the carriage *j*, being pushed a little further forward than before, the end of the bar 5 passes clear over projection 8 and falls down, passing under it as it goes back, tipping the carriage *j* down and catching the hooks into the carriers *a*′, so that they are drawn back by a reverse motion of the carriage through the loops, which are now ready to be cast off of the pins in bar *o* and the stationary pins *n n*, which is done by the operation of cam E. Cam C now pushes down the bar F″, through which the twines pass and draws upon them. The nippers G′, closing by the action of the twine upon them, cause the loops to be drawn up around the pins in bar *l*, when the bar *l* is moved back by its cam, and the pins are drawn out of the knots; and carriage F′, being carried a little further down, the knots are drawn tight. By the straightening of the jointed or toggle-levers H′ H′ any desired amount of strain may be thrown upon the twines to tighten the knots, it being only limited by the strength of the twine. When this strain has been removed by the reverse motion of the levers the cam D pushes down bar Z at the same time cam B′ pushes the bar Y forward so as to bring the netting out clear of the pins in bar Z, and bar Y is also moved endways at the same time by cam H so as to bring the netting right for the pins in bar Z to catch under the row of knots that lie between the bars Y and Z. When bar Z reaches bar Y the latter begins its motion back, carrying the netting on to the pins in bar Z, which, at that time, begins its motion upward, and, as bar Y continues to pass back, the two parts *w w*′ of the bar are slid up on each other endways so as to open their pins and release the twines held between them by means of the recess *k* in cam A. Bar Z continues its motion upward and draws up the netting until most up to place, when bar Y comes forward again, and, taking the twines just above the row of knots tied last, between its pins (having, while it was back, moved endways so as to be in the right position,) they are closed, and bar Z, in finishing its motion upward, draws the knots close up in front of the pins in bar Y. After the pin-bar *l* moves back, and before it comes forward again, it is moved a little endways so that the pins may be on the proper side of the carrier-twines, which lie in the notches in the tops of the race-ways by the cam H. The return motion of the carriage F′, after having drawn the knots tight, is made just so fast as the twine is required to form the next row of loops. This keeps the twine snug around the pins while the loops are being formed. The finished netting is taken over the top beam U, upon which is put a common cloth-spreader, X′, to prevent the netting from drawing in too much towards the middle of the beam. From the spreader it is taken to the reel 2′, and may be wound up around it or passed over and received in a pile on the floor or back of the machine, which may be boarded over to receive it.

Having thus described my invention and the manner of operation, I observe that I do not confine myself to the precise manner in which the various implements are operated, as these may be modified, or different modes may be substituted; (these above described I consider the best when so many movements are produced, all relative to and in combination with each other;) nor to the particular knots specified, as similar alterations to that employed in changing from the "seine knot" to the "square knot," or other slight modifications, will produce others; but what I claim, and desire to secure by Letters Patent, is—

1. I claim the arrangement and combination, substantially as described, of the various implements employed in forming a loop, viz, the bar *m*′, with its row of guides *c c c*, and the bars *l* and *o* with their pins.

2. I claim the bar Y, with its double row of pins for the purpose of holding the netting, as set forth, and when constructed substantially as described.

3. I claim the combination of the regulating screw or screws *i'' i''* with the levers *d'' d''* and V', for the purpose set forth, when arranged substantially as described.

4. I claim the carriage *j*, with the rows of bars *a a*, in combination with the race-ways S S', and thread-carriers *a' a'*, when arranged substantially as described, for the purpose set forth.

5. I claim the toggle-levers H' H' for the purpose of drawing up the knot, substantially as herein described.

6. I claim a machine, constructed and operating substantially as described herein, for making nets or netting.

BENJAMIN ARNOLD.

Witnesses:

WM. D. ARNOLD,

HORACE N. FOSTER.